United States Patent [19]

Oishibashi et al.

[11] Patent Number: 4,762,263
[45] Date of Patent: Aug. 9, 1988

[54] SMALL-SIZED GAS PRESSURE WELDING MACHINE FOR RAILS WITH TWO SEPARATE MECHANISMS FOR PUNCHING-SHEARING EXCESS METAL

[75] Inventors: Hirotsugu Oishibashi; Muneyuki Ohara; Kenzo Hagiwara, all of Tokyo; Hisashi Yoshida, Saitama; Kunio Kitagawa, Saitama; Kimio Shimizu, Saitama, all of Japan

[73] Assignees: Hakusan Seisakusho Co., Ltd.; Railway Technical Research Institute, both of Tokyo, Japan

[21] Appl. No.: 109,620

[22] Filed: Oct. 19, 1987

[30] Foreign Application Priority Data

Oct. 17, 1986 [JP] Japan .................. 61-246883

[51] Int. Cl.$^4$ .................. B23K 20/00; B23K 20/26
[52] U.S. Cl. .................. 228/5.1; 228/13; 228/160; 29/34 R; 72/340
[58] Field of Search .................. 228/5.1, 13, 19, 44.3, 228/125, 160; 29/34 R; 72/340

[56] References Cited

U.S. PATENT DOCUMENTS 4,556,164 12/1985 Oishibashi et al. .
4,576,324 3/1986 Takimoto et al. .

FOREIGN PATENT DOCUMENTS

154777 9/1985 European Pat. Off. .......... 288/5.1
53-4060 2/1978 Japan .

Primary Examiner—Nicholas P. Godici
Assistant Examiner—Samuel M. Heinrich
Attorney, Agent, or Firm—Wenderoth, Lind & Ponack

[57] ABSTRACT

A small-sized gas pressure welding machine for rails comprises a pressure application unit and an excess metal punching unit. The pressure application unit includes a positioning bed disposed along the rail feet of rails to be welded together, a movable pressure application clamp mechanism provided at one end of the positioning bed and a stationary pressure application clamp mechanism provided at the other end of the positioning bed. The movable clamp mechanism clamps the rail foot of one of the rails and provides an abutting pressure. The stationary clamp mechanism clamps the rail foot of the other rail and receives the abutting pressure. The excess metal punching unit is mounted on the other end of the positioning bed to be fitted on the other rail from the railhead thereof and is capable of being mechanically and detachably coupled to the pressure application unit and is provided with an upper excess metal punching mechanism for punching excess metal off the railheads, rail webs and rail foot upper surfaces of abutted end portions of the rails in one direction. On the other hand, the movable pressure application clamp mechanism is provided with a lower excess metal punching mechanism for punching excess metal off the rail foot lower surfaces of the rails in the other direction opposite to the aforementioned one direction.

1 Claim, 10 Drawing Sheets

SMALL-SIZED GAS PRESSURE WELDING MACHINE FOR RAILS WITH TWO SEPARATE MECHANISMS FOR PUNCHING-SHEARING EXCESS METAL

BACKGROUND OF THE INVENTION AND RELATED ART STATEMENT

The present invention relates to a portable gas pressure welding machine for gas pressure welding rails together and punching-shearing excess metal formed on the welded portion of the rails and, more particularly, to a small-sized gas pressure welding machine for rails with two separate mechanisms for punching-shearing excess metal, which machine comprises a combination of a pressure application unit mounted along rails to be welded together and provided with a mechanism for punching-shearing excess metal from the lower surface of the rail foot and an excess metal punching unit fitted on the railhead and provided with a mechanism for punching-shearing excess metal from the railhead, rail web and upper surface of the rail foot.

As for the related art, there are cited Japanese Patent Publication No. SHO 53-4060, U.S. Pat. No. 4,556,164 and U.S. Pat. No. 4,576,324, for example. The Japanese Patent Publication discloses a gas pressure welder comprising in combination a movable pressure application bed for clamping one of rails to be welded together through connecting media of a plurality of guide stays and applying pressure to the other rail, a stationary bed for clamping the other rail and receiving the pressure from the movable bed, and punching-shearing means, which are assembled together so as to be movable relative to one another. Therefore, the welder is generally large in size and heavy in weight. Furthermore, the welder has to be fitted on rails by raising the entire body thereof. Since the welder is heavy in weight, it is required to use a crane or the like in fitting the welder on rails. This means that the welder is inferior in maneuverability in the working of transportation, installation and field welding and that much labor is required.

OBJECT AND SUMMARY OF THE INVENTION

One object of the present invention is to provide a gas pressure welding machine for rails, which can be assembled without need of fitting the entirety thereof but by merely fitting part thereof on rails.

Another object of the present invention is to provide a gas pressure welding machine for rails, which is superior in maneuverability, small in size and light in weight, and in which a portion thereof to be fitted on rails is provided as an assembly unit independent of the remaining elements to facilitate transportation, installation, field welding and other operations.

Still another object of the present invention is to provide a gas pressure welding machine for rails, which permits excess metal formed on the lower surface of the rail foot and excess metal formed on the railhead, rail web and upper surface of the rail foot to be punched beautifully with punching forces applied in opposite directions and also permits readier design and manufacture of a punching blade structure compared with a prior art punching mechanism for punching excess metal in one direction with a set of punching blades surrounding the rails.

To attain the objects described above, according to the present invention, there is provided a small-sized gas pressure welding machine for rails with two separate mechanisms for punching-shearing excess metal, which comprises a pressure application unit including a positioning bed disposed along the rail feet of rails to be welded together, a movable pressure application clamp mechanism provided at one end of the positioning bed and a stationary pressure application clamp mechanism provided at the other end of the positioning bed, the movable clamp mechanism being for clamping the rail foot of one of the rails and providing an abutting pressure, the stationary clamp mechanism being for clamping the rail foot of the other rail and receiving the abutting pressure; and an excess metal punching unit mounted on the other end of the positioning bed to be fitted on the other rail from the railhead thereof and capable of being mechanically and detachably coupled to the pressure application unit, said excess metal punching unit being provided with an upper excess metal punching mechanism for punching excess metal off the railheads, rail webs and railfoot upper surfaces of abutted end portions of the rails in one direction, the movable pressure application clamp mechanism of the pressure application unit being provided with a lower excess metal punching mechanism for punching excess metal off the rail foot lower surfaces of the rails in the other direction opposite to the one direction of punching operation of the upper excess metal punching mechanism.

The above and other objects, characteristic features and advantages of the present invention will become apparent to those skilled in the art as the disclosure is made in the following description of a preferred embodiment of the invention, as illustrated in the accompanying drawings.

DETAILED DESCRIPTION OF THE PREFERRED EMBODIMENT

Now, an embodiment of the present invention will be described with reference to the accompanying drawings.

Figure 6:
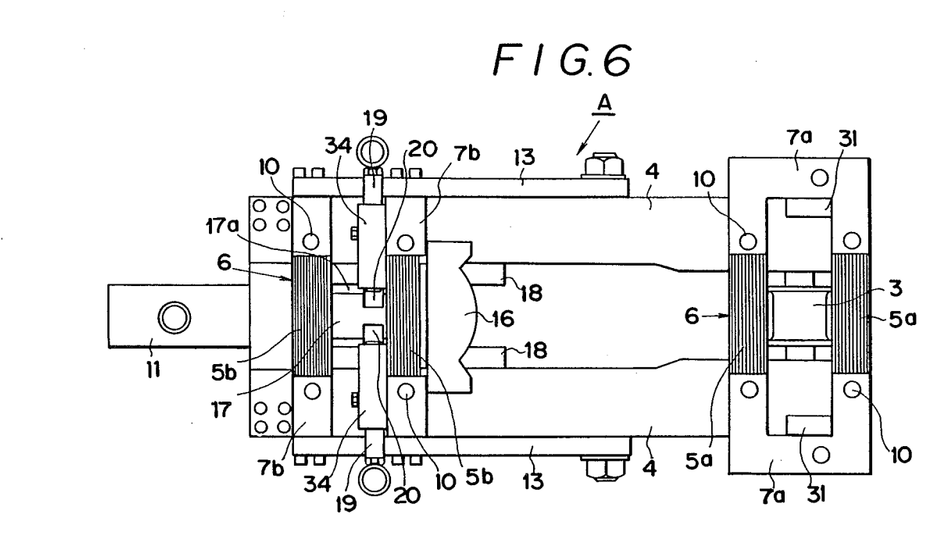
FIG. 6 is a plan view illustrating a pressure application unit constituting part of the same machine.
Figure 7:
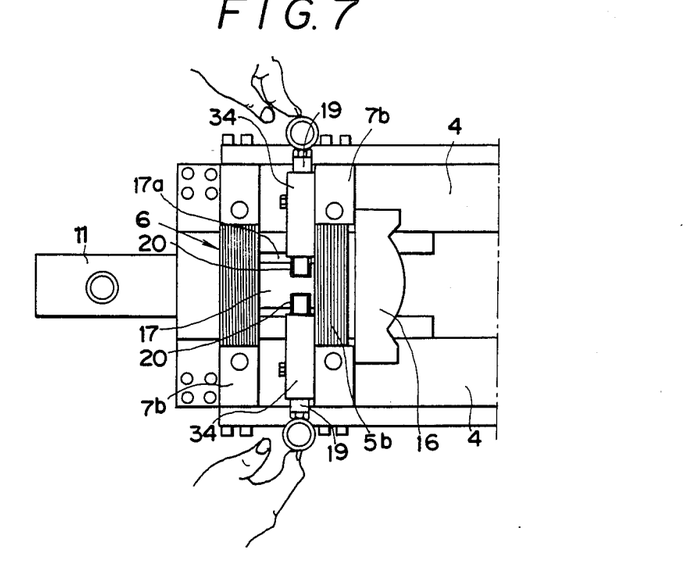
FIG. 7 is a fragmentary plan view illustrating the same machine with a connection key in a locked state.
Figure 8:
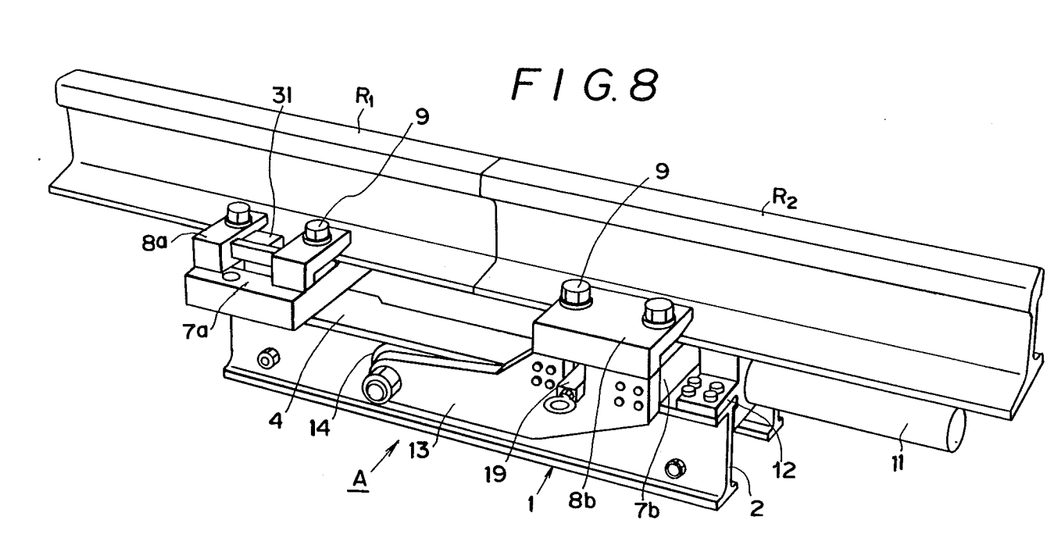
FIG. 8 is a perspective view illustrating the same pressure application unit held clamped on rails.

The gas pressure welding machine for rails illustrated in FIGS. 1 to 5 comprises a pressure application unit A as illustrated in FIGS. 6 to 8 and an excess metal punching unit B as illustrated in FIGS. 9 to 13. The pressure application unit A clamps rails $R_1$ and $R_2$ to be pressure welded together and gives abutting force to them for the pressure welding. The excess metal punching unit B punches excess metal formed by the pressure welding on the railhead, rail web and upper surface of the rail foot. The pressure application unit A has a pair of clamp mechanisms, one of which is a movable pressure application clamp mechanism having a function to punch the excess metal off the lower surface of the rail foot.

The pressure application unit A has a positioning bed 1, which is disposed along the rail foot of the rails to be gas pressure welded together. The positioning bed 1 has a bridge structure 2 consisting of a pair of spaced-apart and parallel vertical legs. A roller 3 is rotatably mounted between the pair of vertical legs of the bridge structure 2 so that the bridge structure 2 can be transported along the rails which have been laid. By assembling the bridge structure 2, a support bed 4 is formed such that it extends horizontally at the top. One end of the support bed 4 is provided with an integral transversal tie-like stationary rail seat 5a. The other end of the support bed 4 is provided with a movable rail seat 5b having similar structure. The lower surface of the foot of the rail $R_1$ is supported on the stationary rail seat 5a, and the lower surface of the foot of the other rail $R_2$ is supported on the movable rail seat 5b. The rails $R_1$ and $R_2$ to be pressure welded together are thus held horizontally on the two rail seats 5a and 5b. In this state, the opposed rail end faces are abutted between the stationary and movable rail seats 5a and 5b. The surfaces of the rail seats 5a and 5b which support the lower surfaces of the rail feet and non-slip seat surfaces and are formed with a number of blade-like portions 6 extending in the width direction of a rail.

Stationary clamp seats 7a are integrally connected to the opposite ends of the stationary rail seat 5a, and movable clamp seats 7b are integrally connected to the opposite ends of the movable rail seat 5b. Clamp plates 8a and 8b are secured by bolts 9 to the respective stationary and movable clamp seats 7a and 7b. The foot of the rail $R_1$ is firmly clamped between the stationary rail seat 5a and the clamp plates 8a, while the foot of the rail $R_2$ is firmly clamped between the movable rail seat 5b and the clamp plates 8b. Reference numeral 10 designates bolt insertion holes formed in the clamp seats 7a and 7b for the clamp plates 8a and 8b.

The movable rail seat 5b, movable clamp seat 7b and clamp plates 8a and 8b constitute a movable pressure application clamp mechanism. To guide the movable pressure application clamp mechanism, a pair of arms 13 are provided on the opposite sides of the movable clamp seat 7b. The arms 13 extend along the opposite sides of the support bed 4 and have rollers 14 rotatably mounted in their free end portions. The rollers 14 are supported by the underside of the support bed 4. The movable pressure application clamp mechanism is moved along the upper surface of the support bed 4 for pressure application with the rollers 14 guided by the underside of the support bed 4.

Figure 1:
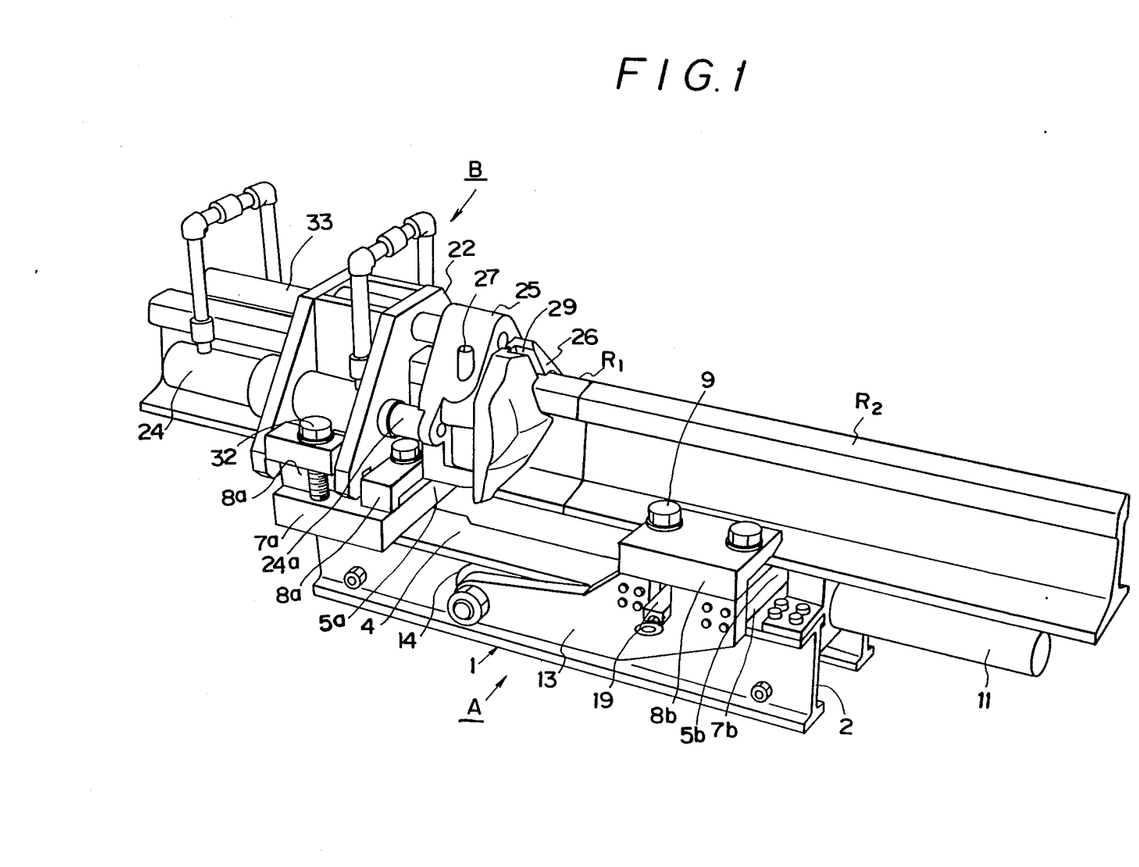
FIG. 1 is a perspective view illustrating one embodiment of a small-sized gas pressure welding machine for rails with two separate mechanisms for punching-shearing excess metal according to the present invention, the machine being installed on rails to be welded together.
Figure 2:
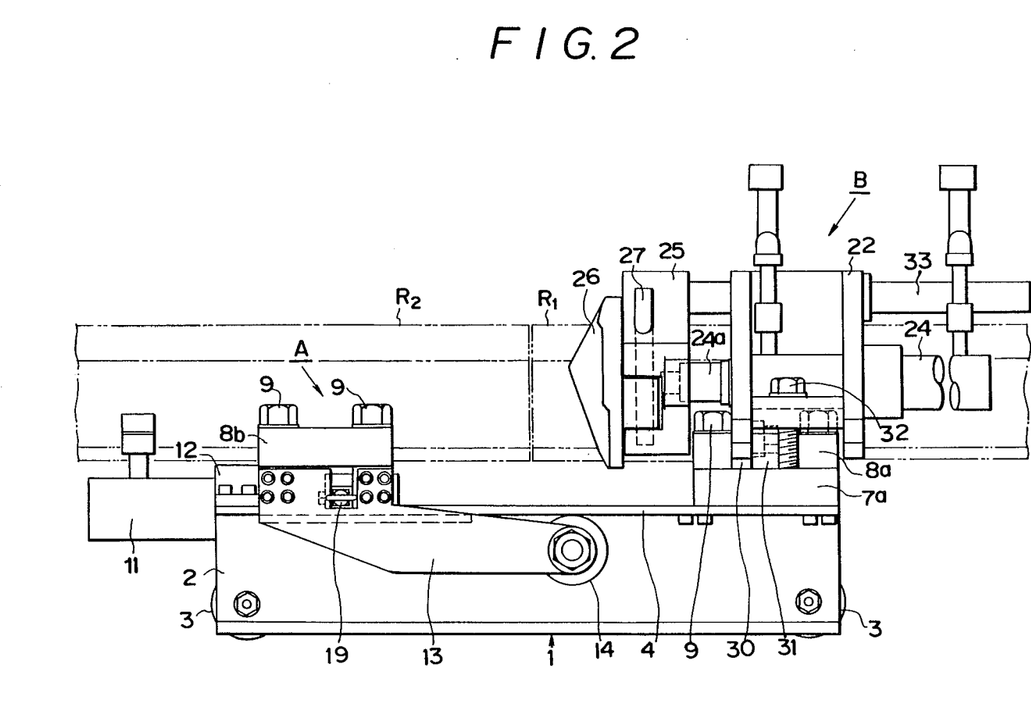
FIG. 2 is a side view illustrating the same machine.
Figure 3:
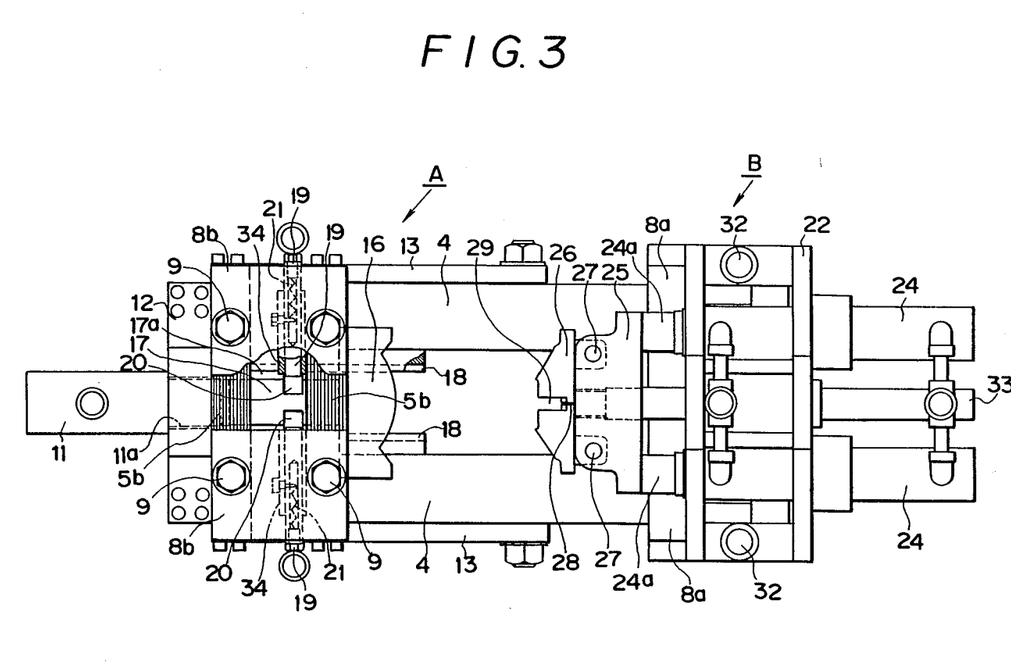
FIG. 3 is a plan view, partly broken away, illustrating the same machine.
Figure 4:
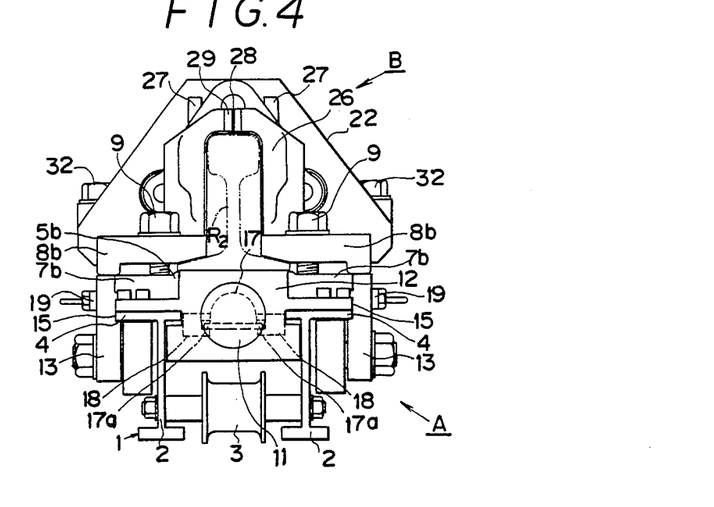
FIG. 4 is a front view illustrating the same machine.
Figure 5:
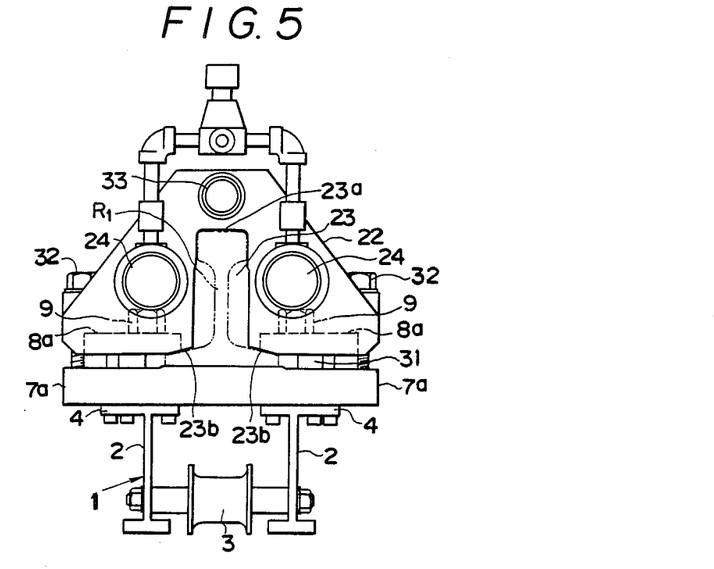
FIG. 5 is a rear view illustrating the same machine.

For the movement and pressure application of the movable pressure application clamp mechanism, a piston-cylinder assembly 11 is provided both for pressure application for pressure welding and for drive of a punching blade. The piston-cylinder assembly 11 is provided between the pair of legs of the bridge structure 2 via a bracket 12 provided at one end of the bridge structure 2 such that its cylinder rod 11a is elongated and contracted below and in the longitudinal direction of the rails to be pressure welded together.

In order to prevent the movable pressure application clamp mechanism from rattling in the width direction of the rails and ensure straight reciprocation, the inner surface of each of the arms 13 is slidably engaged with a corresponding ear portion of the support bed 4. With these slidable engagement surfaces serving as guides 15, the upper and lower surfaces of the support bed 4 are supported by the movable rail seat 5b and roller 14.

A punching blade 16, which constitutes a lower excess metal punching mechanism, is disposed ahead the cylinder rod 11a. The punching blade 16 is a flat blade which is moved along the lower surface of the rail foot. A slider 17 is provided on the opposite side of the edge of the punching blade 16 such that its end surface faces the end face of the cylinder rod 11a. With elongation of the cylinder rod 11a, the punching blade 16 is moved along and parallel with the lower surface of the rail foot to punch the excess metal formed on the rail foot lower surface. In order to hold the punching blade 16 such that it is not detached from the clamp mechanism and permit smooth movement of the clamp mechanism for the punching, a pair of guide rails 18 are provided integrally with the bridge structure 2, and opposite sides of the slider 17 integral with the punching blade 16 are provided with slide pieces 17a each in slidable engagement with each of the guide rails 18. The slider 17 and punching blade 16 are mounted in the clamp mechanism, and the aforementioned movement is brought about under the guide of the guide rails 18.

The piston-cylinder assembly 11 constitutes a drive source for moving the punching blade 16 alone to punch excess metal. Also, it can cause movement of the movable pressure application clamp mechanism to produce pressure welding force.

For transmitting the drive force of the piston-cylinder assembly 11 to the movable pressure application clamp mechanism, a connection key 19 is provided. The connection key 19 is inserted into the movable pressure application clamp mechanism from each side thereof such that it extends at right angles relative to the slider 71, and its end is detachably engaged in a key groove 20 formed in each side surface of the slider 17. In order to permit insertion and removal of the connection key 19 with respect to the engagement position, a cylindrical key holder 34 is provided on each side of the movable rail seat 5b, and the connection key 19 is removably inserted in the key holder 34 and is biased in the releasing direction by a spring 21 provided in the key holder 34. When the connection key 19 is forcibly inserted against the biasing force of the spring 21, its end is engaged in the key groove 20, whereby the punching blade 16 and movable pressure application clamp mechanism are keyed to each other. When the cylinder rod 11a of the piston-cylinder assembly 11 is elongated from the keyed state by operating the piston-cylinder assembly 11, the slider 17 is pushed, and the urging force given to the slider 17 is transmitted to the movable pressure application clamp mechanism via the connection key 19 to cause movement of the mechanism while holding the connection key 19 in the keyed state. As a result, the end surface of the rail $R_2$ is abutted with strong force with the end surface of the rail $R_1$ held clamped in the stationary clamp mechanism. The abutted rails are heated using a gas burner (not shown) in the presence of the applied abutting pressure to effect pressure welding.

When the piston-cylinder assembly 11 is rendered inoperative, the urging force provided by the cylinder rod 11a to the slider 17 is released. As a result, the connection key 19 is released from retaining force provided by the slider 17 and retreated to a release position by the spring 21. When the piston-cylinder assembly 11 is operated again with the connection key in the released state, the punching blade 16 is moved in the forward direction along the lower surface of the rail foot, thus removing excess metal W formed as the result of the pressure welding.

Figure 9:
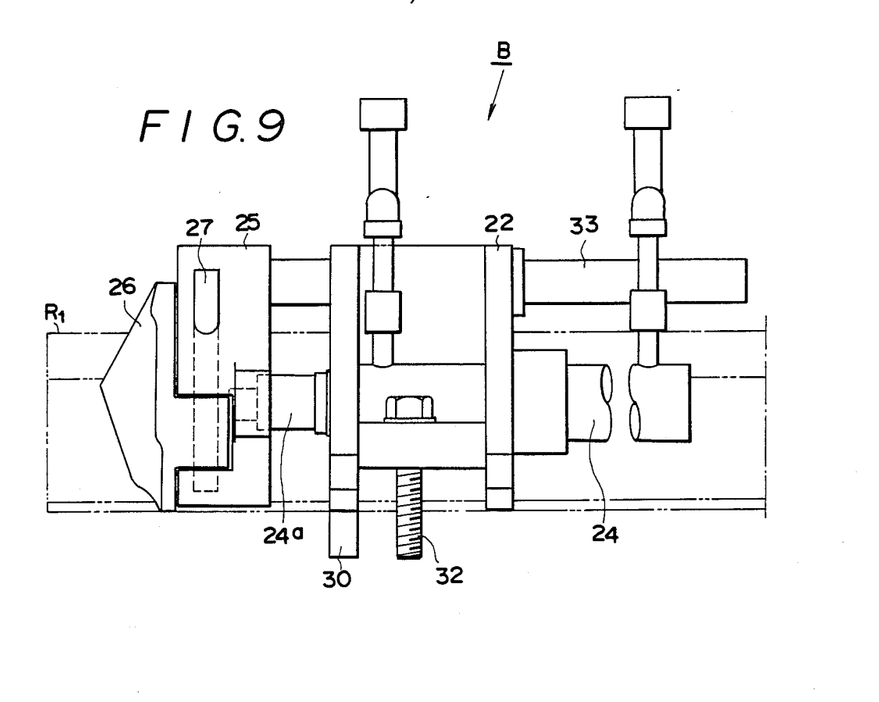
FIG. 9 is a side view illustrating an excess metal punching unit constituting part of the same machine.
Figure 10:
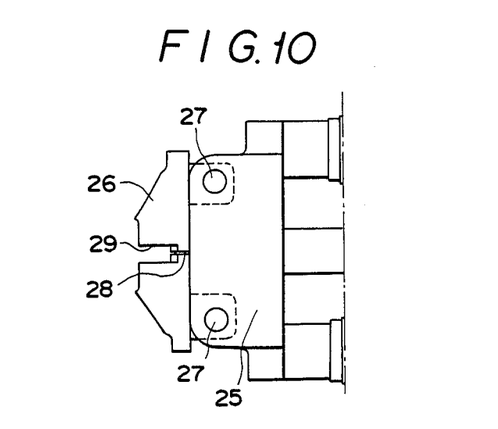
FIG. 10 is a plan view illustrating the excess metal punching unit with a punching blade in a closed state.
Figure 11:
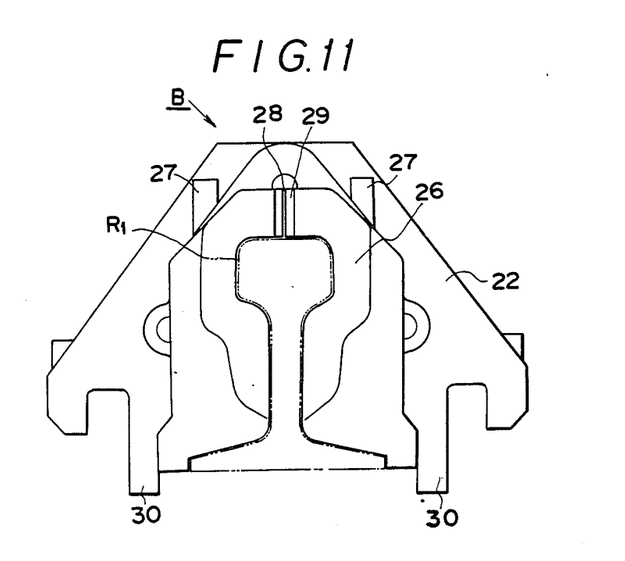
FIG. 11 is a front view illustrating the same excess metal punching unit in the blade closed state.

The excess metal punching unit B has a punching blade holder block 22 which consists of a frame symmetrical in shape with respect to the rail $R_1$. The holder block 22 has a rail reception recess 23 to be fitted on the railhead of the stationary side rail $R_1$ from above. The holder block 22 with the rail reception recess 23 is secured to the top of the stationary clamp mechanism. The top inner surface 23a of the recess 23 is supported by the top surface of the railhead received in the rail reception recess 23. At the same time, the edges 23b of the opening of the rail reception recess 23 is supported by the upper surface of the rail foot. Furthermore, left and right side frame portions of the holder block 22 are secured by bolts 32 to the positioning bed 1. For example, the clamp seat 7a of the stationary clamp mechanism is bolted to the positioning bed 1.

The excess metal punching unit B and pressure application unit A are mechanically coupled together by the bolts 32 into an integral structure. Furthermore, the two units A and B can be disassembled by loosening the bolts 32, and the unit B alone is capable of being removed and moved.

The punching blade holder block 22 supports a pair of punching blade driving piston-cylinder assemblies 24 such that they extend parallel to each other on the opposite sides of the stationary side rail $R_1$. Furthermore, a guide stay 33 is provided such that it extends along the center line of the railhead of the rail $R_1$. Cylinder rods 24a of the piston-cylinder assemblies 24 and guide stay 33 are disposed such that they can undergo elongation and contraction in the longitudinal direction of the rail. A punching blade holder 25 is mounted on the end side of the cylinder rods 24a and guide stay 33, and a punching blade 26 is mounted on the punching blade holder 25.

Figure 12:
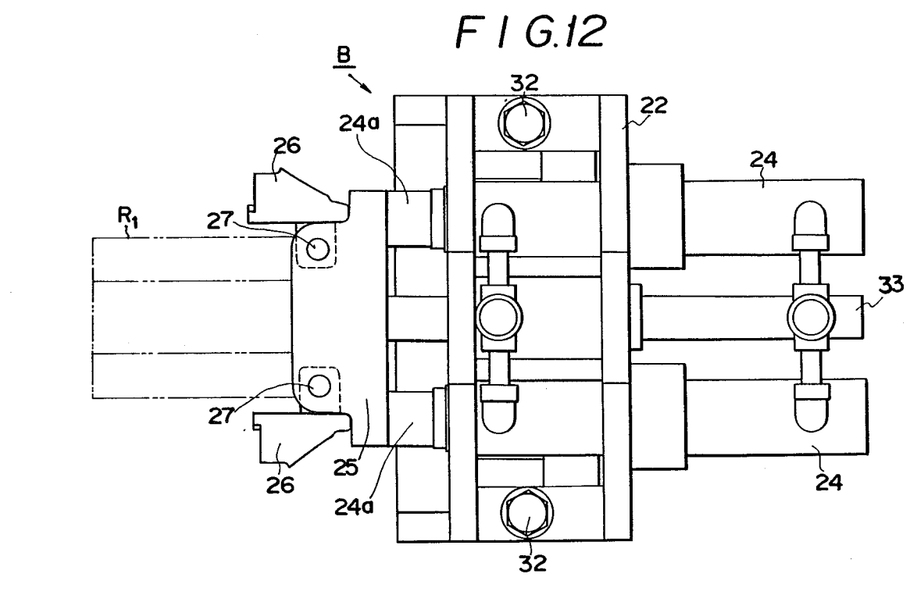
FIG. 12 is a plan view illustrating the same excess metal punching unit with the punching blade in an open state.
Figure 13:
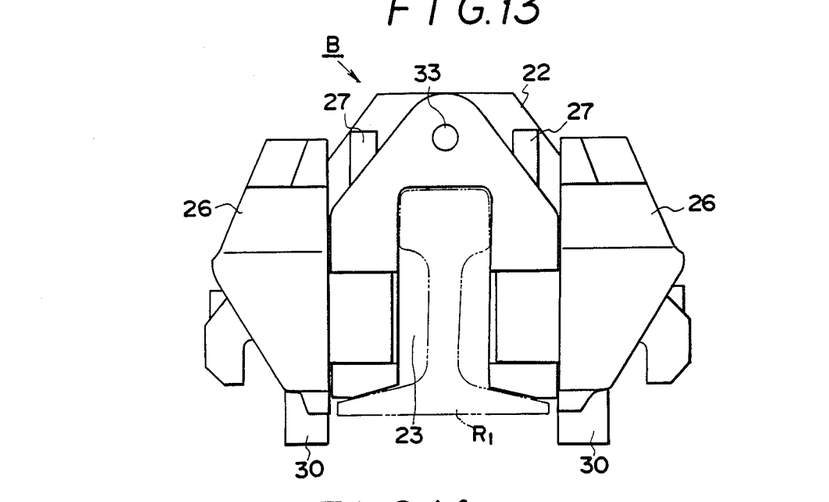
FIG. 13 is a front view illustrating the same excess metal punching unit in the blade open state.

The punching blade 26 surrounds the railhead and extends along the rail web and the upper and side surfaces of the rail foot. It consists of two divisions on the opposite sides of the center line of the railhead. The two punching blade divisions are rotatably coupled by respective vertical shafts 27 to the punching blade holder 25, such that they can be turned outwardly and away from each other about the shafts 27.

When they are turned about the shafts 27 into contact with the rail, they are in contact with the railhead, rail web and upper and side surfaces of the rail foot.

The rod 24a of the piston-cylinder assembly 24 is elongated with operation thereof in the aforementioned contact state. With this elongation the punching blade 26 is advanced together with the punching blade holder 25 to punch the excess metal W off the railhead, rail web and upper and side surfaces of the rail foot during the advancing stroke.

Figure 14A:
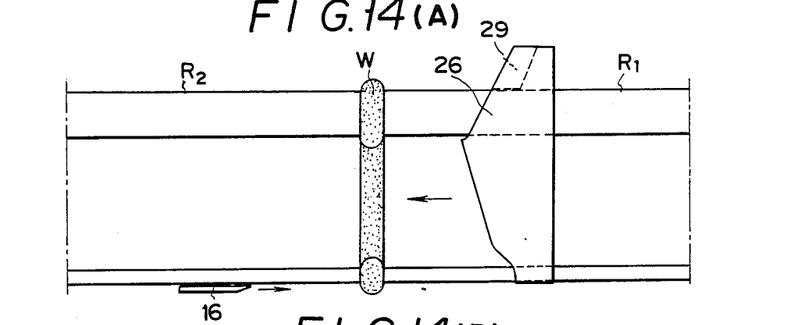
FIGS. 14(A) and 14(B) are side views for explaining the punching of the excess metal by lower and upper punching blades.
Figure 14B:
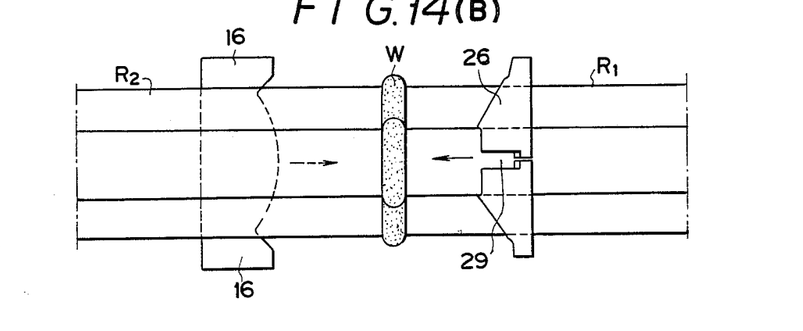

The two halves of the punching blade 26 have grooves 29 formed along their mating edges 28. As illustrated in FIG. 14, the punching blade 26 punches off the excess metal W formed on the railhead with its portions formed with the grooves 29 after the action of other blade and divides the previously punched excess metal into two portions in its portions formed with the grooves 29. More specifically, the excess metal W continuous to the railhead, rail web and upper surface of rail foot is sheared into two divisions at the top of the railhead, thus facilitating the removal of the punched excess metal.

This punching mechanism is referred to as an upper excess metal punching mechanism and the rail foot lower surface excess metal punching mechanism assembled in the movable pressure application clamp mechanism is referred to as a lower excess metal punching mechanism.

The upper and lower excess metal punching mechanisms are moved to exert shearing forces in opposite directions to shear off the excess metal W. The excess metal W is divided in the grooves 29 and also in adjacent portions between the upper and lower excess metal punching mechanisms. The upper and lower excess metal punching mechanisms act on the excess metal W in opposite directions to effect shearing of the excess metal W readily and beautifully with reduced shearing force. The punching of excess metal formed on the side surfaces of the rail foot may be undertaken by the punching blade 16 of the lower excess metal punching mechanism.

In order to resist the reaction force in punching the excess metal, upper stoppers 30 are provided such that they depend from the punching blade holder block 22 toward the support bed 4 on the opposite sides of the rail, while lower stoppers 31 are provided such that they extend upright from the positioning bed 1. The upper stoppers 30 are adapted to be engaged with the inner surface of the lower stoppers 31, so that a retreating force provided by the holder block 22 is resisted by the engagement of the two stoppers in cooperation with the bolts 32.

When the excess metal punching unit B is brought into contact with the rail, it is in a standby state, and immediately afterward it is operated to effect the punching of excess metal. The abutting force required for the gas pressure welding of rails is provided by the pressure application unit A. More specifically, the rail foot of the rail $R_2$ supported on the positioning bed 1 is clamped by the movable pressure application clamp mechanism, and the rail foot of the other rail $R_1$ supported on the positioning bed 1 is clamped by the stationary clamp mechanism. Then, a keyed state is set up by the connection key 19 such that the pressure provided by the piston-cylinder assembly 11 can be transmitted to the movable pressure application clamp mechanism, and then the piston-cylinder assembly 11 is operated. As a result, a moving force is exerted to the movable pressure application clamp mechanism and rail $R_2$ to move them toward rail $R_1$ to apply pressure on the butted surfaces of rails $R_1$ and $R_2$. In this state, the butted portions are heated using a gas burner (not shown) to promote welding. Since the application of pressure to the butted surfaces and heating of the neighborhood of the butted surfaces are effected simultaneously, metal heated at high temperature is swollen out to form excess metal W. When the excess metal W has grown to a predetermined size, the operation of the piston-cylinder assembly 11 is stopped to complete pressure welding. As the gas burner, commercially available ones may be used.

When the pressure application cylinder assembly 11 is released, the connection key 19 is automatically retreated to the release position by the biasing force of the spring 21.

With the connection key in the released state, the piston-cylinder assembly 11 is operated again and, at the same time, the punching blade driving piston-cylinder assembly 24 of the excess metal punching unit B is operated. Thus, the punching blades 16 and 26 of the lower and upper excess metal punching mechanisms are caused to wedge into the excess metal W in opposite directions, so that the excess metal is beautifully punched and sheared off.

As has been described in the foregoing, according to the present invention it is possible to provide a gas pressure welding machine for rails, which can be assembled without need of mounting the entire body thereof on rails to be welded together, but by merely mounting the excess metal punching unit alone on the rails and mechanically coupling it to the pressure application unit.

Furthermore, since the excess metal punching unit is formed independently of the pressure application unit for mounting and assembly, the machine as a whole can be assembled very easily, and by releasing the mechanical coupling the excess metal punching unit can be separated from the pressure application unit and moved alone, and high maneuverability in transportation, installation, field welding, etc.

Furthermore, according to the present invention the mechanism portion to be mounted on rails to be welded together can be minimized, so that it is possible to attain size and weight reduction of the machine as a whole.

Moreover, the excess metal formed on the rail foot lower surface and excess metal formed on the railhead as the result of the gas pressure welding can be beautifully punched with punching forces applied in opposite directions, and also the design and manufacture of the punching blade structure can be facilitated compared with the prior art excess metal punching mechanism, in which excess metal is punched in one direction by a set of punching blades disposed to surround rails.

What is claimed is:

1. A small-sized gas pressure welding machine for rails with two separate mechanisms for punching-shearing excess metal, which comprises:

a pressure application unit including a positioning bed disposed along the rail feet of rails to be welded together, a movable pressure application clamp mechanism provided at one end of said positioning bed and a stationary pressure application clamp mechanism provided at the other end of said positioning bed, said movable clamp mechanism being for clamping the rail foot of one of the rails and providing an abutting pressure, said stationary clamp mechanism being for clamping the rail foot of the other rail and receiving the abutting pressure, an excess metal punching unit mounted on the other end of said positioning bed to be fitted on the other rail from the railhead thereof and capable of being mechanically and detachably coupled to said pressure application unit, said excess metal punching unit being provided with an upper excess metal punching mechanism for punching excess metal off the railheads, rail webs and rail foot upper surfaces of abutted end portions of the rails in one direction, said movable pressure application clamp mechanism being provided with a lower excess metal punching mechanism for punching excess metal off the rail foot lower surfaces of the rails in the other direction.

* * * * *